US007894160B2

(12) United States Patent
Kobayashi et al.

(10) Patent No.: US 7,894,160 B2
(45) Date of Patent: Feb. 22, 2011

(54) THIN-FILM MAGNETIC HEAD CONTROLLING FLOATING AMOUNT BY LOCALLY PROJECTING ELEMENT PORTION TOWARD RECORDING MEDIUM BY THERMAL EXPANSION AND METHOD OF MANUFACTURING THE SAME

(75) Inventors: Kiyoshi Kobayashi, Niigata-ken (JP); Kunio Koizumi, Niigata-ken (JP); Kenji Ichinohe, Niigata-ken (JP)

(73) Assignee: TDK Corporation, Tokyo (JP)

( * ) Notice: Subject to any disclaimer, the term of this patent is extended or adjusted under 35 U.S.C. 154(b) by 683 days.

(21) Appl. No.: 11/684,455

(22) Filed: Mar. 9, 2007

(65) Prior Publication Data

US 2007/0211381 A1 Sep. 13, 2007

(30) Foreign Application Priority Data

Mar. 10, 2006 (JP) ............................ 2006-066261

(51) Int. Cl.
*G11B 5/40* (2006.01)

(52) U.S. Cl. ........................... 360/125.31; 360/125.32; 360/125.74; 360/125.75

(58) Field of Classification Search ............ 360/125.31, 360/125.33, 125.74, 125.752
See application file for complete search history.

(56) References Cited

U.S. PATENT DOCUMENTS

| | | | | |
|---|---|---|---|---|
| 6,909,674 | B2 * | 6/2005 | Ju et al. | 369/13.17 |
| 6,963,464 | B2 * | 11/2005 | Xu et al. | 360/75 |
| 7,428,124 | B1 * | 9/2008 | Song et al. | 360/128 |
| 7,430,098 | B1 * | 9/2008 | Song et al. | 360/294.7 |
| 2003/0021065 | A1 * | 1/2003 | Yamada et al. | 360/126 |
| 2003/0099054 | A1 * | 5/2003 | Kamijima | 360/59 |
| 2003/0235014 | A1 * | 12/2003 | Yamanaka et al. | 360/317 |
| 2004/0240109 | A1 * | 12/2004 | Hamann et al. | 360/126 |
| 2005/0018348 | A1 * | 1/2005 | Lille et al. | 360/128 |
| 2005/0117242 | A1 | 6/2005 | Taguchi | |
| 2006/0034013 | A1 * | 2/2006 | Kato et al. | 360/128 |
| 2006/0196248 | A1 * | 9/2006 | Nakano et al. | 73/31.06 |
| 2008/0218909 | A1 * | 9/2008 | Kurihara et al. | 360/319 |

FOREIGN PATENT DOCUMENTS

| | | |
|---|---|---|
| JP | 2004-30723 | 1/2004 |
| JP | 2005-011413 | 1/2005 |
| JP | 2005-166106 | 6/2005 |
| JP | 2007-149308 | 6/2007 |

OTHER PUBLICATIONS

Office Action issued in corresponding Japanese Patent Application P2006-066261; issued Feb. 17, 2009.

* cited by examiner

*Primary Examiner*—William J Klimowicz
*Assistant Examiner*—Carlos E Garcia
(74) *Attorney, Agent, or Firm*—Brinks Hofer Gilson & Lione

(57) ABSTRACT

A thin-film magnetic head which can locally project a reproduction element toward a recording medium and a method of manufacturing the thin-film magnetic head are provided. The thin-film magnetic head includes a reproduction element, a recording element which is stacked on the reproduction element and has a pair of magnetic core layers and a coil layer configured to apply a recording magnetic field to the magnetic core layers, and a heat-emitting member emitting heat by electrification, which causes the reproduction element to project toward the recording medium by thermal expansion. The heat-emitting member is disposed below the coil layer.

4 Claims, 5 Drawing Sheets

THIN-FILM MAGNETIC HEAD CONTROLLING FLOATING AMOUNT BY LOCALLY PROJECTING ELEMENT PORTION TOWARD RECORDING MEDIUM BY THERMAL EXPANSION AND METHOD OF MANUFACTURING THE SAME

This application claims the benefit of Japanese Patent application No. 2006-066261 filed Mar. 10, 2006, the entire contents of which are incorporated herein by reference.

TECHNICAL FIELD

The present invention relates to a thin-film magnetic head which controls an amount of floating of the head by locally projecting an element portion toward a recording medium by thermal expansion, and a method of manufacturing the thin-film magnetic head.

BACKGROUND

A thin-film magnetic head includes a reproduction element having a multilayer film exhibiting a magnetoresistance effect between a lower shield layer and an upper shield layer. The head reads magnetic information from a recording medium on the basis of a variation in resistance of the multi-layer film. At least one of recording media has a pair of magnetic core layers opposed to each other on a medium-opposed surface to the recording medium with a magnetic gap layer interposed therebetween. Magnetic information is recorded by applying a magnetic field leaked from the magnetic gap layer to the recording medium. In a complex-type thin-film magnetic head having both the reproduction element and the recording element, the recording element is stacked on the reproduction element.

In the thin-film magnetic head, it is preferably to make a facing gap between an element portion smaller so as to improve head characteristics (emitting characteristic and recording characteristic). Related art teaches that the element portion projects toward the recording medium at a distance of approximately several nm by thermal expansion by using a heat-emitting member emitting heat by electrification. The heat-emitting member is formed in a plane pattern parallel to the film surfaces of the layers constituting the thin-film magnetic head, and is disposed between the layers. Specifically, the heat-emitting member is disposed on the bottom layer of a lower core layer or on the top layer of an upper core layer, between the lower core layer and the upper core layer, or in a surface protecting layer. The thin-film magnetic head having the heat-emitting member is disclosed in Patent Documents JP-A-2005-011413 and JP-A-2005-166106 (US 2005117242A1).

However, in the related art, since the projecting the element portion to the recording medium expands the periphery of the element portion by heat, it is difficult to control the element portion to project farther toward the recording medium. Assuming that a projection amount in the periphery of the element portion is larger than the projection amount in the element portion, the periphery of the element portion is in contact with the recording medium before the element portion. Therefore, there is a possibility that the recording and emitting characteristics will be deteriorated and the recording medium will be damaged. Further, in related art, since heat efficiency (the ratio between heat supplied to the element portion and a total heat emitted by the heat-emitting member) is low and it is necessary to increase an electrical power supplied to the heat-emitting member so as to cause the element to project farther, thus efficiency is lowered.

SUMMARY

The present invention solves the above-described problem. It is an object of the present invention to provide a thin-film magnetic head capable of locally projecting a reproduction element toward a recording medium and a method of manufacturing thereof.

The present invention considers that the optimal position of the heat-emitting member is below the coil layer, in that the approach of a heat-emitting member to the reproduction element enhances an amount of heat delivered to the reproduction element to increase a projecting amount of the reproduction element.

According to an aspect of the invention, there is provided a thin-film magnetic head including a reproduction element, a recording element which is stacked on the reproduction element having a pair of magnetic core layers and a coil layer applying a recording magnetic field to the magnetic core layers, and a heat-emitting member emitting heat by electrification, which causes the reproduction element to project toward a recording medium by thermal expansion. The heat-emitting member is disposed below the coil layer.

The coil layer may have a coil pattern formed at predetermined pitches. The heat-emitting member has an edge portion parallel with the coil pattern, and the edge portion is disposed between the pitches of the coil layer. The coil layer may have a coil pattern formed at predetermined pitches, and the heat-emitting member may have an edge portion parallel with the coil pattern. The edge portion may be disposed closer to a recording medium than to an end face of the coil layer opposed to the recording medium.

The heat-emitting member may be buried in a coil insulating layer which is disposed immediately below the coil layer. The coil insulating layer may have a first insulating layer which is formed on the reproduction element, a second insulating layer formed on the first insulating layer so as to cover the heat-emitting member, which is then planarized, and a third insulating layer which is stacked on the second insulating layer in which the coil layer may be formed on the third insulating layer.

The coil layer may be a coil having a toroidal shape which is wound vertically around a pair of the magnetic core layers in one direction, or may be or a coil having a spiral shape which is wound around a magnetic connection portion of the pair of the magnetic core layers. When forming the toroidal shaped coil, since the coil layer includes an upper coil and a lower coil, which are disposed above and below one of the pair of magnetic core layers, respectively and in which a plurality of coil lines longitudinal in a track width direction is arranged in a height direction, and a contact portion connected to the upper coil and the lower coil at both ends in the track width direction, the heat-emitting member may be disposed below the lower coil. At the time of forming the spiral shaped coil, since the coil layer includes the spiral shape plane coil pattern, which is wound around the magnetic connection portion of the magnetic core layer between the pair of the magnetic core layers, the heat-emitting member may be provided below the plane coil pattern.

According to another aspect of the present invention, there is provided a method of manufacturing a thin-film magnetic head including a reproductive element, and includes a recording element which is stacked on the reproduction element and has a pair of magnetic core layers and a coil layer configured to apply a recording magnetic field to the magnetic core layers. Also included is a heat-emitting member emitting heat by electrification, which causes the reproduction element to project toward a recording medium by thermal expansion.

The method including the steps of forming a first insulating layer on the reproduction element, forming the heat-emitting member on the first insulating layer, forming a second insulating layer on the first insulating layer so as to cover the heat-emitting member, planarizing an upper surface of the second insulating layer, forming a coil insulating layer including the first insulating layer, the second insulating layer, and the third insulating layer by stacking the third insulating layer on the planarized second insulating layer, and forming the coil layer on the third insulating layer.

According to the present invention, since the heat-emitting member is disposed in the lower side of the coil layer, a distance from the reproduction element and the heat-emitting member is shortened and the heat emitted from the heat-emitting member is supplied to the reproduction element efficiently. Accordingly, the thin-film magnetic head which locally project the reproduction element toward the recording medium and the method of manufacturing thereof can be obtained.

DRAWINGS

DETAILED DESCRIPTION

Figure 1:
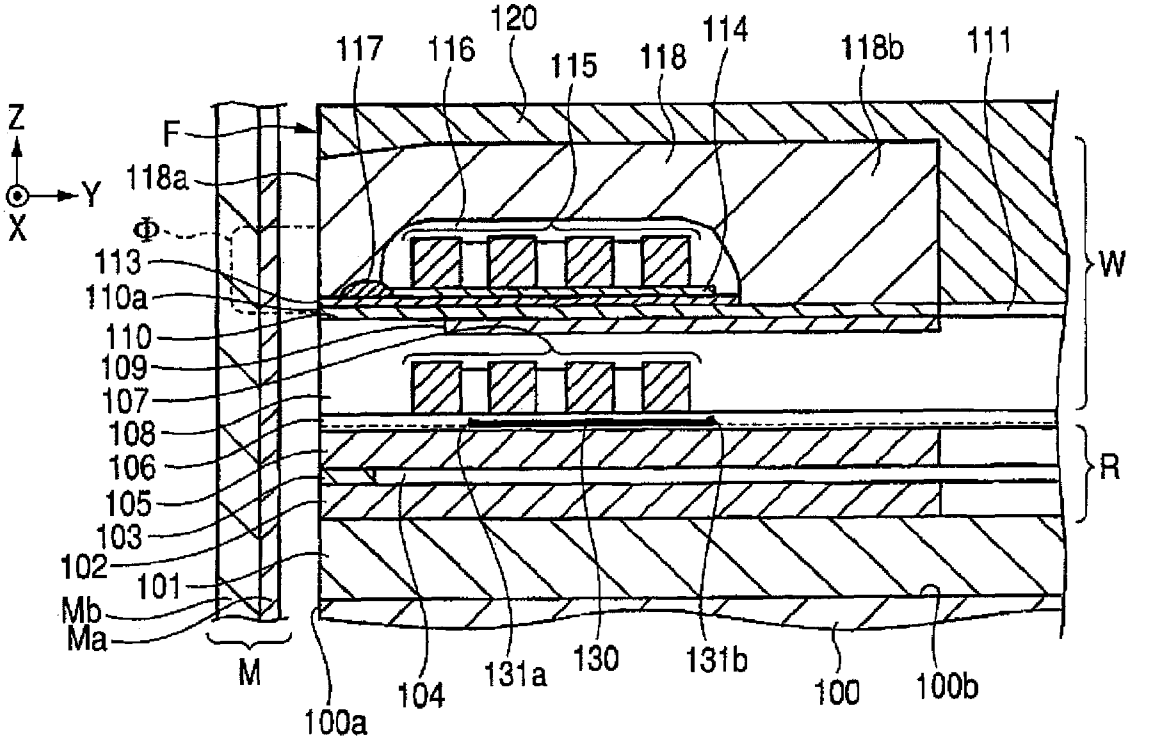
FIG. 1 is a fragmentary cross-sectional view of the stacked structure of a thin-film magnetic head according to a first embodiment of the invention showing a sectional view taken along Line I-I of FIG. 2.

The present invention will be described with reference to the drawings. In the drawings, an X direction represents a track width direction, a Y direction represents a height direction, an a Z direction represents the stacking direction of each layer forming the thin-film magnetic head and the movement direction of a recording medium.

Figure 2:
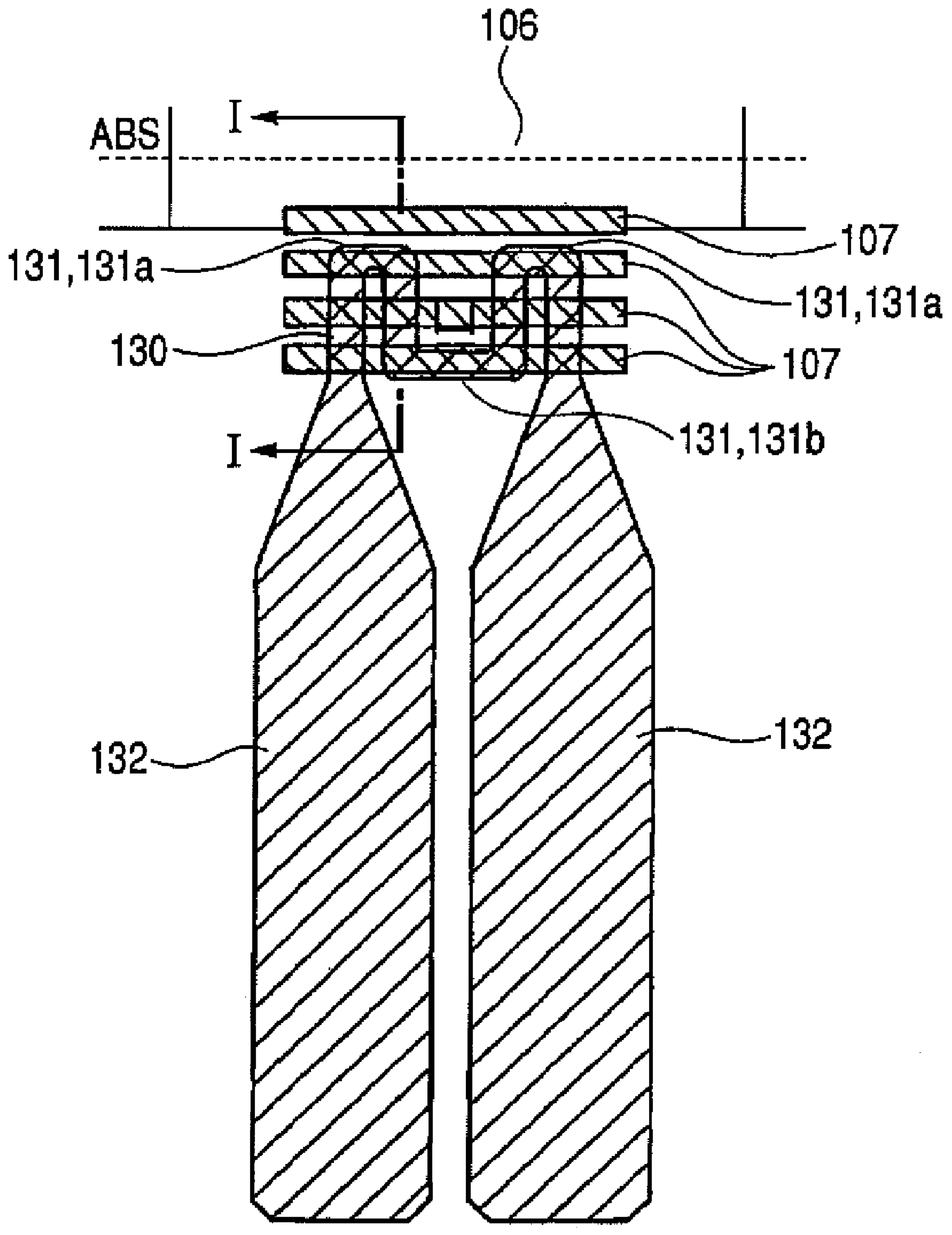
FIG. 2 is a plan view illustrating a position relationship of a heat-emitting member of FIG. 1 and a lower coil.
Figure 3:
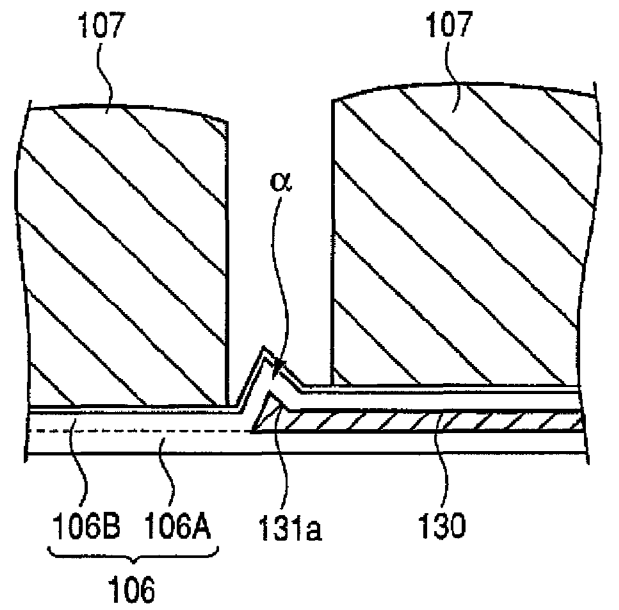
FIG. 3 is an expanded sectional view illustrating an edge portion of a medium-opposed surface of a heat-emitting member of FIG. 1.

FIGS. 1 to 3 illustrate a thin-film magnetic head h1 according to a first embodiment of the invention. FIG. 1 is a fragmentary cross-sectional view of a stacked structure of a thin-film magnetic head H1 (a sectional view taken along Line I-I of FIG. 2).

The thin-film magnetic head H1 is a vertical magnetic recording head having a reproducing portion R and reproducing portion W formed by stacking thin-films on the trailing end face 100*b* of a slider 100. The reproducing portion R reads magnetic information from a recording medium M by using a magnetoresistance effect, and the recording portion W performs a recording operation by applying a vertical magnetic field ϕ to the recording medium M and magnetizing the hard film Ma of the recording medium M perpendicularly.

The recording medium M includes the hard film Ma having high remanant magnetization thereon and a soft film Mb having a high magnetic permeability on the inner side of the hard film Ma. The recording medium M has a disk shape and rotates on the center of the disk which serves as a rotation axis. The slider 100 is made of nonmagnetic materials such as $Al_2O_3$ and $SiO_2$, and the like. When a medium-opposed surface 100*a* is opposite to the recording medium M and the recording medium M rotates, the slider 100 is levitated from the surface of the recording medium M by airflow thereon.

A protective layer 101 made of the nonmagnetic insulating materials such as $Al_2O_3$ and $SiO_2$ is formed on the trailing end face 100*b* of the slider 100 and the reproducing portion R is formed on the protective layer 101. The reproducing portion R includes a lower shield layer 102, an upper shield layer 105, a gap insulating layer 104 interposed between the lower shield layer 102 and the upper shield layer 105, and a reproduction element 103 positioned in the gap insulating layer 104. The reproduction element 103 is the magnetoresistance effect element such as AMR, GMR, and TMR.

The recording portion W is stacked on the upper shield layer 105. The recording portion W includes a plurality of lower coils 107 formed on the upper shield layer 105 with a coil insulating foundation layer 106 interposed therebetween, a main magnetic pole layer 110 (a magnetic core layer), a magnetic gap layer 113, a plurality of upper coils 115 formed on the magnetic gap layer 113 with the coil insulating foundation layer 114 interposed therebetween, and the return yoke layer 118 (magnetic core layer).

The lower coil 107 is formed of one or more kinds or two or more kinds of nonmagnetic metal materials selected from Au, Ag, Pt, Cu, Cr, Al, Ti, NiP, Mo, Pd, Rh and Ni. Alternatively, the lower coil 107 may have a stacking structure in which the nonmagnetic metal materials are stacked. The lower coil insulating layer 108 is formed in the vicinity of the lower coil 107.

The main magnetic pole layer 110 and a sub-yoke layer 109 being in magnetic contact with the main magnetic core layer 110 are formed on the lower coil insulating layer 108. The sub-yoke layer 109 is made of the magnetic material having magnetic flux saturation density lower than the main magnetic core layer 110 is formed directly below the main magnetic core layer 110 and serves as a part of the main magnetic core layer 110. The top portions of the sub-yoke layer 109 and the lower coil insulating layer 108 are planarized. A coating foundation layer is formed on the planarized plane and the main magnetic core layer 110 is formed on the coating foundation layer. The main magnetic core layer 110 has a predetermined Y-direction length from an opposed surface F (hereinafter, referred to as an opposed surface 'F') to the recording medium. The X-direction size of a front-end face 110*a* is defined as a recording track width Tw. The main magnetic core layer 110 is coated with ferromagnetic materials having high saturation magnetic flux density, such as Ni—Ce, Co—Fe, NI—Fe—Co, and so on.

The magnetic gap layer 113 is formed on the main magnetic pole layer 110 and an insulating material layer 111 buried in the vicinity thereof (opposed sides of the X direction and the Y-direction rear of the main magnetic pole layer 110). A throat height-determining layer 117 made of an inorganic material or an organic material is formed on the magnetic gap layer 113 is positioned away from the opposed surface F by a predetermined distance. The throat height of the thin-film magnetic head H is defined by the distance from the opposed surface F to the throat height-determining layer 117.

The upper coil 115 is formed of one or more kinds or two or more kinds of nonmagnetic metal materials selected from Au, Ag, Pt, Cu, Cr, Al, Ti, NiP, Mo. Pd, Rh, and Ni similarly to the lower coil 107. Alternatively, the upper coil 115 may have the stacking structure in which the nonmagnetic metal materials are stacked. The upper coil-insulating layer 116 is formed in the vicinity of the upper coil 115.

The X-direction end portions of the lower coil 107 and the upper coil 115 are in electrical contact with each other and are solenoid-like in shape. The shape of the coil layer is not limited only to the solenoid shape. The shape of the coil layer may be the spiral shape which is wound around the contact portion 118*b* between the main magnetic pole layer 110 and the return yoke layer 118.

The return yoke layer 118 is formed of the ferromagnetic material such as permalloy from the upper coil-insulating layer 116 through the magnetic gap layer 113. The return yoke layer 118 has the front-end face 118*a* exposed from the opposed surface F and is opposed to the main magnetic core layer 110 on the opposed surface F by a gap. The rear end portion in the height direction of the return yoke layer 118 is a contact portion 118*b* in contact with the main magnetic pole layer 110. The return yoke layer 118 is covered with a surface protecting layer 120.

The thin-film magnetic head H having an entire configuration includes a heat-emitting member 130 which emits heat by the electrification provided in a lower layer of the lower coil 107. The present invention includes the heat-emitting member 130. With reference to FIGS. 2 to 3, a configuration in which the heat-emitting member is disposed according to a first embodiment will be described below.

FIG. 2 is a plan view illustrating a position relationship of a heat-emitting member 130 and a lower coil 107. FIG. 3 is an expanded sectional view illustrating an edge portion of the medium-opposed surface in the heat-emitting member 130. The heat-emitting member 130 is formed of a heat-emitting member pattern of an inverse Ω shape which surrounds the reproduction element 103 from both sides of a track width direction toward the rear side of the height direction. The heat-emitting member 130 includes an edge portion 131 (131*a*, 131*b*) parallel to the lower coil 107 on the medium-opposed surface side of the medium and on the inner side of the height direction. The edge portion of the medium-opposed surface is a front edge portion 131*a* and an edge portion of the on the inner side in the height direction is a rear edge portion 131 *b*. The heat-emitting member 130, for example, is made of NiFe, CuNi, or CuMn by using a sputter method. Accordingly, as shown in FIG. 3, a burr occurs in the edge portion 131 of the heat-emitting member 130 and a step portion α is formed by the burr of the edge portion 131 in a surface of the coil insulating layer 106 which burying the heat-emitting member 13. The coil insulating layer 106 is formed of a first insulating layer 106A which is interposed between the upper shield layer 105 and the heat-emitting member 13, and the second insulating layer 106B which is formed by covering the heat-emitting member 13 on the first insulating layer.

The heat-emitting member 130 is disposed so that the edge portion 131*a* and 131*b* are disposed between a pitch of the lower coil 107. A position of the heat-emitting member 130 is regulated so that the light can not reach the step portion α of the coil insulating layer 106 contributing the edge portion 131*a* and 131*b* of the heat-emitting member 130 at the time of exposing during formation of the lower coil 107 by a frame coating method. When the light reaches the step portion α, it causes the diffused reflection to cut a regist frame, a coil cross-sectional shape which is formed in the regist frame increases more than a first design and the coil resistance is reduced. In addition, when the regist frame becomes black, a short between coils occurs by the diffused reflection. When the edge portion 131*a* and 131*b* are positioned on the pitch of the lower coil 107 according to the embodiment, since the regist frame forming the lower coil 107 is formed on the step portion α of the coil insulating layer 106, accordingly the step portion α is not be exposed at the time of exposing and the lower coil 107.

The heat-emitting member 130 includes a pair of a lead wiring portions 132 which extend toward the inner side of the height direction more than the rear end portion in the height direction of a reproduction element 103, and is electrified from the inner side of the height direction between the pair of the lead wiring portions 132. The heat emitted from the heat-emitting member 130 is supplied from the heat-emitting member 130 to the opposed surface F side and emits the heat around the reproduction element 103 from the both sides of the track width direction and the rear end side of the height direction.

Accordingly, the gap insulation 104 expands locally and projects the reproduction element 103 toward the recording medium M side around the reproduction element 103. Since a distance from the heat-emitting element 130 to the reproduction element 103 is shortened, the heat emitted from the heat-emitting member 130 is supplied substantially to the gap insulating layer 104 around the reproduction element 103, and a projection efficiency of the reproduction element 103 is increased. Accordingly, when the reproduction element 103 is locally projected toward the recording medium M, a facing gap between the reproduction element 103 and the recording medium M is narrowed and reproduction output can be increased. Accordingly, since a portion other than the reproduction element 103 does not contact the recording medium M, the recording medium M can be prevented from damage.

In the present embodiment, since the floating amount of the thin-film magnetic head H1 is set to approximately 10 nm, and the maximum projection of the reproduction element 103 when headed is approximately 5 nm, it is possible to reduce the distance between the element portion and the recording medium M to approximately a half of the distance at the time when the heat-emitting member 130 is not activated. It is possible to control the projecting amount of the reproduction element 103 in accordance with the heat-emitting temperature of the heat-emitting member 130 based on the amount of current supplied to the heat-emitting member 130.

Figure 4:
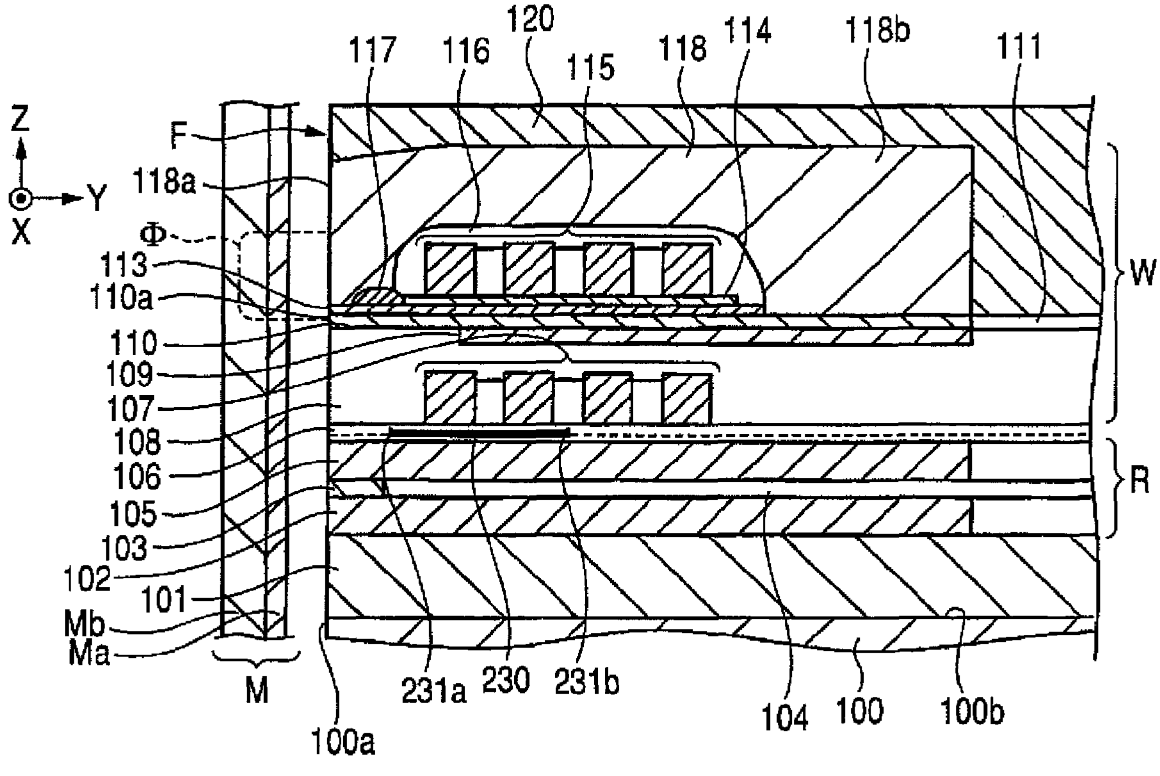
FIG. 4 is a cross-sectional view of a stacked structure of a thin-film magnetic head according to a second embodiment of the invention showing a sectional view taken along Line IV-IV according to FIG. 5.
Figure 5:
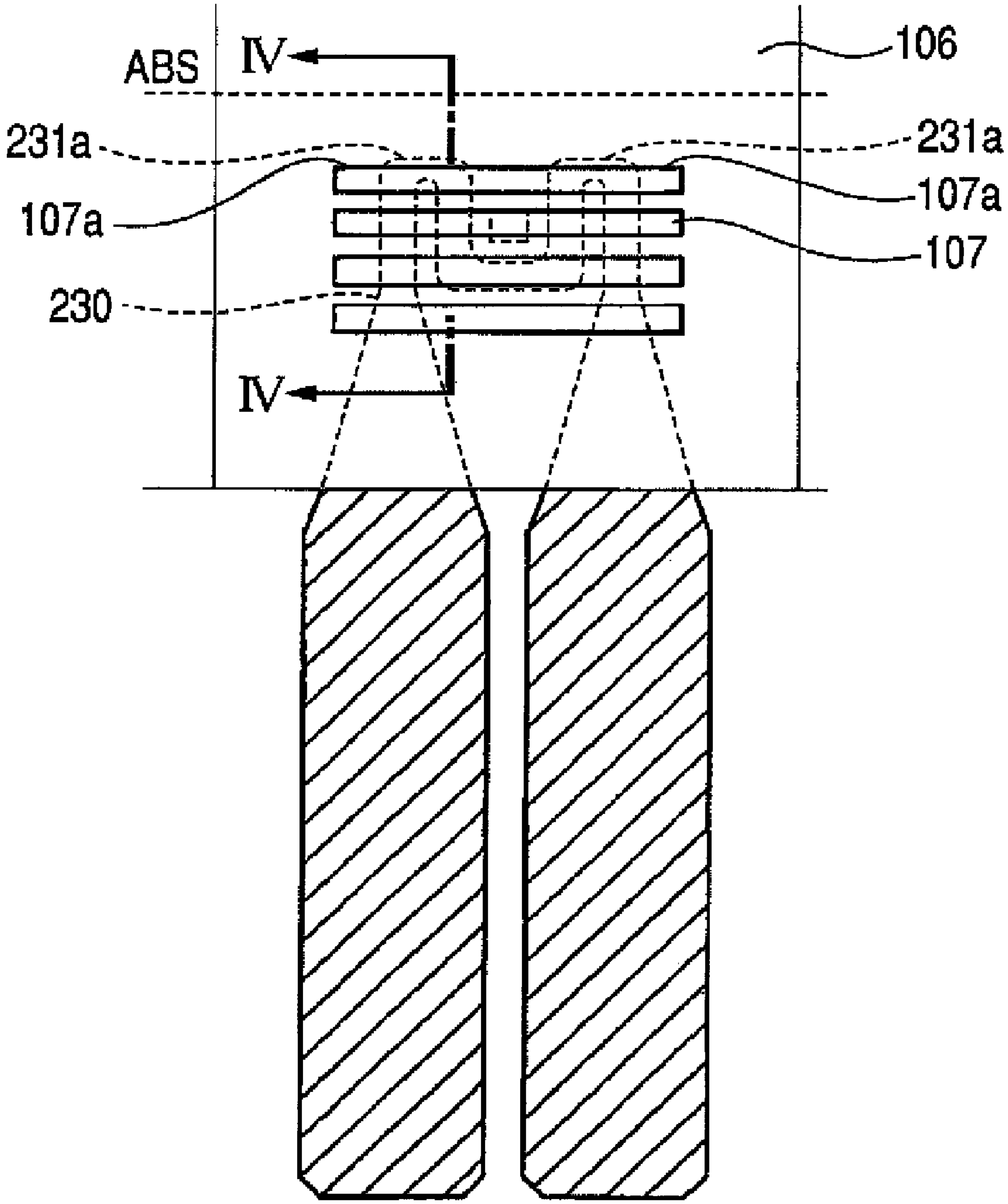
FIG. 5 is a plan view illustrating a position relationship of a heat-emitting member of FIG. 4 and a lower coil.

FIGS. 4 to 5 show a thin-film magnetic head H2 according to a second embodiment of the invention. FIG. 4 is a cross-sectional view of the stacked structure of the thin-film magnetic head H2 (a sectional view taken along Line IV-IV of FIG. 5). FIG. 5 is a plan view illustrating a positional relationship of a heat-emitting member 230 and a lower coil 107.

The thin-film magnetic head H2 according to the second embodiment is different from that of the first embodiment in that a front-end edge portion 231*a* of the heat-emitting member 230 is disposed closer to the opposed surface F side than to the front-end portion 107*a* of the lower coil 107. The configuration other than the position where the heat-emitting member 230 is disposed in the same as the configuration of the first embodiment. In FIGS. 4 and 5, the same reference numerals as FIG. 1 are used to show the same components.

The font-end edge portion 231*a* of the heat-emitting member 230 shows a heat-emitting member pattern which is formed parallel to a coil pattern of the lower coil 107. By disposing the front-end edge portion 231*a* closer to the opposed surface F side than to the front-end surface 107*a*, that is, by disposing the front-end edge portion 231*a* out of a coil forming area, at the time of forming the lower coil 107, the step portion of the coil insulating layer 106, which is formed by the front-end edge portion 231*a*, is not be exposed by covering the regist frame. Accordingly, the diffused reflection can be prevented at the time of exposure. Accordingly, when the heat-emitting member 230 is provided in the lower coil 107, the lower coil 107 is formed. Accordingly, the distance between the heat-emitting member 230 and the reproduction element 103 is shortened and the projection efficiency of the reproduction element 103 is increased.

Figure 6:
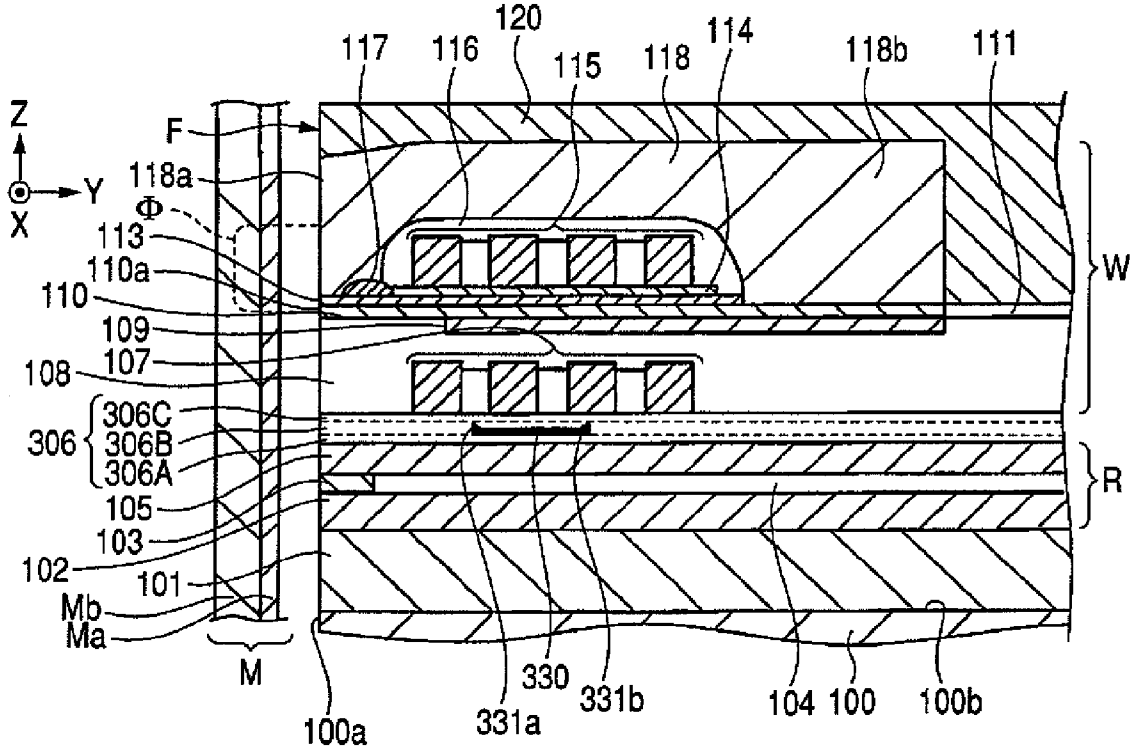
FIG. 6 is a sectional view of stacked structure of a thin-film magnetic head according to a third embodiment of the invention.

FIG. 6 shows a stacked structure of a thin-film magnetic head H3 according to a third embodiment of the invention. The thin-film magnetic head H3 of the third embodiment is different from the first embodiment in that the coil insulating layer 306 of the three-layered structure is provided. In FIG. 6, the same reference numerals as in the first embodiment are used to show the same components. FIG. 2 shows the positional relationship of a heat-emitting member 330 and a lower coil 107.

The coil insulating layer 306 is formed of a second insulating layer 306B of which an upper surface is subjected to a planarization process (CMP process), and a third insulating layer 306C which is stacked on the planarization surface of the second insulating layer 306B after forming a first insulating layer 306A which is stacked on the upper shield layer 105 and covering the heat-emitting member 330 on the first insulating layer 306A.

In the third embodiment, in the first place, the coil insulating layer 306 and the heat-emitting member 330 are formed by a process described below. The first insulating layer 306A is formed on the reproduction element 103, that is, the first insulating layer 306A is formed on the upper shield layer 105. Next, the heat-emitting member 330 is formed on the first insulating layer 306. Then, the second insulating layer 306B covering the heat-emitting member 330 is formed on the first insulating layer 306, and an upper surface of the second insulating layer 306B is planarized. After the planarization process, the third insulating layer 306C is stacked on the upper surface of the second insulating layer 306B (a planarization surface). Accordingly, the coil insulating layer 306 which is formed of the three-layered structure of the first insulating layer 306A, the second insulating layer 306B, and the third insulating layer 306C can be obtained. The lower coil 107 is formed on the third insulating layer 306C.

When the planarization process is performed to the upper surface of the second insulating layer 306B, as described above, since a burr occurs in the edge portion 331 (331*a*, 331*b*) of the heat-emitting member 330, the edge portion 331 of the heat-emitting member 330 may be exposed to the surface by the planarization process. Since the third insulating layer 306C covers the surface by the planarization process of the second insulating layer 306B, when the edge portion 331 of the heat-emitting member 330 is exposed to the planarizing operating surface of the second insulating layer 306B, an insulating characteristic between a reproduction portion R and a recording portion W can be obtained. The film thickness of the third insulating layer 306C is uniform and the upper surface (the surface on which the coil layer 107 is formed) is the flat surface.

According to the coil insulating layer 306, since the step portion which causes the diffused reflection at the time of exposing for forming the lower coil 107 can not be made, the lower coil 107 can be formed when the heat-emitting member 330 is disposed below the lower coil 107. Accordingly, since the distance between the heat-emitting member 330 and the reproduction element 103 becomes shorter, the projection efficiency of the reproduction element 103 can be increased. In the third embodiment of the invention, although the edge portion 331 of the heat-emitting member 330 is disposed in the pitches of the lower coil 107, since the step portion is not formed to the coil insulating layer 306, a position where the heat-emitting member 330 is disposed is configured irrespective of a relation of the lower coil 107. Accordingly, freedom of design can be improved.

Because the heat-emitting member 130 (230, 330) is disposed below the coil layer (the lower coil 107), the gap distance between the heat-emitting member 130 (230, 330) is shortened, the heat emitted from the heat-emitting member 130 is supplied substantially to the reproduction element 103, and thus the projection efficiency of the reproduction element 103 can be increased. That is, the reproduction element 103 can be projected locally to the recording medium M side. Accordingly, since the reproduction output can be improved the recording medium M is prevented from being damaged.

In the first embodiment and the second embodiment, the position where the heat-emitting member 130 (230) is disposed is regulated so that the edge portion 131 (231) of the heat-emitting member 130 (230) is disposed between the coil pitches. Accordingly, at the time of forming the lower coil 107, the step portion α of the coil insulation 106 by the edge portion 131 (231) is covered with the regist frame, the diffused reflection does not occur, and the exposure is performed properly. Accordingly, since the heat-emitting member 130 (230) is disposed below the lower coil without difficulty, the lower coil 107 can be obtained.

In the third embodiment, the coil insulating layer 306 disposed directly below the lower coil 107 has the three-layered structure of the first insulating layer 306A, the second insulating layer 306B, and the third insulating layer 306C. The upper surface of the coil insulating layer 306 (the formed surface of the lower coil 107) is planarized by the third insulating layer 306C. When the step portion is not formed on the coil insulating layer 306, the diffused reflection does not occur at the time of exposing during formation of the lower coil 107, and the lower coil 107 can be obtained. In addition, the insulation characteristics can be obtained for the reproduction portion R and the recording portion W by having the third insulating layer 306C.

In the above-mentioned embodiments, the thin-film magnetic head having the coil layer in a toroidal form. The present invention can applied to the thin-film magnetic head having the coil layer of a spiral shape in which a plane coil pattern is wound around the connection portion of the magnetic core layer between the pair of the magnetic core layers (the main magnetic pole layer, the return yoke layer). At this time, the heat-emitting member can be disposed below the plane coil pattern.

What is claimed is:

1. A thin-film magnetic head, comprising:

a reproduction element;

a recording element stacked on the reproduction element, including a pair of magnetic core layers and a coil layer configured to apply a recording magnetic field to the magnetic core layers; and a heat-emitting member emitting heat by electrification configured to cause the reproduction element to project toward a recording medium by thermal expansion, wherein the heat-emitting member is disposed below the coil layer and formed of a heat-emitting member pattern of an inverse Ω shape as seen from the stacking direction, the heat-emitting member surrounding the reproduction element from both sides of a track width direction toward the rear side of a height direction;

wherein the coil layer has a coil pattern formed at predetermined pitches, the heat-emitting member has an edge portion of a medium-opposed surface side that is parallel with the coil pattern, and the edge portion of the medium-opposed surface side is disposed between the pitches of the coil layer; and wherein the edge portion of the medium-opposed surface side is disposed closer to the recording medium than a contact portion connecting the pair of magnetic core layers.

2. The thin-film magnetic head according to claim 1, wherein the heat-emitting member is contained within a coil insulating layer disposed between the reproducing element and the recording element.

3. The thin-film magnetic head according to claim 2, wherein the coil insulating layer has a first insulating layer formed on the reproduction element, a second insulating layer formed on the first insulating layer so as to cover the heat-emitting member, which second insulating layer is planarized, and a third insulating layer which is stacked on the second insulating layer, and wherein the coil layer is formed on the third insulating layer.

4. The thin-film magnetic head according to claim 1, wherein the coil layer includes an upper coil and a lower coil which are disposed above and below one of the pair of magnetic core layers, respectively and in which a plurality of coil lines longitudinal in a track width direction is arranged in a height direction, and contact portions, each connected to the upper coil and the lower coil, at both ends in the track width direction, and wherein the heat-emitting member is disposed below the lower coil.

* * * * *